United States Patent Office 3,725,167
Patented Apr. 3, 1973

3,725,167
METHOD OF MAKING WIRE BRAID HYDRAULIC HOSE
Fred W. Love and William J. Hunt, Youngstown, Ohio, assignors to Aeroquip Corporation, Jackson, Mich.
Continuation-in-part of application Ser. No. 538,488, Mar. 17, 1966, which is a continuation-in-part of application Ser. No. 189,811, Apr. 24, 1962, both now abandoned. This application Nov. 15, 1971, Ser. No. 198,971
Int. Cl. B31c 13/00; F16l 11/10, 11/16
U.S. Cl. 156—143                                      5 Claims

ABSTRACT OF THE DISCLOSURE

A method of making a wire braid hydraulic hose which when made according to certain specifications will have a known average burst pressure and a known average life of pressure impulse cycles wherein the hose is subjected, immediately after curing, to an internal pressure of approximately 80 to 95 percent of the known burst pressure, maintaining said pressure momentarily and relieving the same whereby the individual wires of the braid will be realigned and repositioned into a permanent close contact with each other so as to substantially increase the strength of the hose and increase the number of pressure impulse cycles it will withstand well above the known average to thereby increase the life expectancy of the hose.

---

This is a continuation-in-part of our application Ser. No. 538,488, filed Mar. 17, 1966, now abandoned which was a continuation-in-part of our earlier application Ser. No. 189,811, filed Apr. 24, 1962, now abandoned.

This invention relates to hydraulic hose and more particularly to a method of making hydraulic hose in which a wire reinforcing structure is incorporated and whereby a hydraulic hose is produced that has a service life many times as long as similar hydraulic hose heretofore known in the art.

The principal object of the invention is the provision of a method of preconditioning a wire braid reinforced hydraulic hose at the time of manufacture by internally pressurizing the same to a point near its burst pressure rating so as to produce a greatly improved hose.

A further object of the invention is the provision of a method of preconditioning a wire reinforced hydraulic hose so as to condition the hose and particularly the wire braid reinforcing portions thereof to withstand an unusually high number of pressure impulses in service.

A still further object of the invention is the provision of a method of prealigning and setting the wire reinforcing portions of a wire braid reinforced hydraulic hose whereby the physical pattern and relation of the wires is improved.

The essential feature of this invention is the internal application of fluid pressure in a critical pressure range to a newly formed hydraulic hose to accomplish the foregoing objects.

The method of preconditioning a wire reinforced hydraulic hose disclosed herein is particularly applicable to one and two layer wire braid hose wherein the hose incorporates one or two tubular wire braids and the usual rubber like tube and rubber like cover. Such hydraulic hose is designed to conduct various types of gases and liquids at both high and low pressures. The hose comprises a highly flexible tubular construction of the selected rubber like compound either elastomers or polymers reinforced with braided plies of wire and usually includes a braided ply of selected textile yarns or a combination of textile and wire and fabricated as by setting the polymers or vulcanizing the elastomers. By way of example a ½" I.D. wire reinforced hose is commonly subjected to pressures of 3500 p.s.i. pulsing or surging to 5250 p.s.i., and has heretofore had an average life of approximately 60,000 pressure impulse cycles. By practicing the method disclosed herein to precondition the hose, the average life is increased to 600,000 impulse cycles or more, thereby achieving a remarkable increase in life expectancy.

The wire reinforced hydraulic hose which is subject to the preconditioning method disclosed herein is formed in the more or less conventional manner known in the art and immediately after fabrication the pressurizing step herein disclosed is performed simultaneously with a testing operation so that the method does not add time or expense to the production of a highly superior hydraulic hose.

The invention is illustrated in the accompanying drawing which comprises exaggerated cross sectional details of typical 1 and 2 braid hose before and after the preconditioning method has been applied, and wherein.

Figure 1:
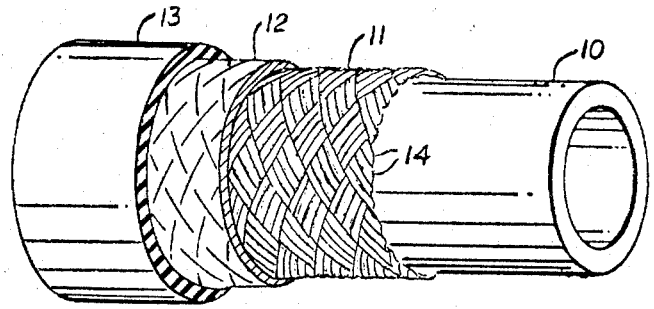
FIG. 1 is a side elevation of a portion of a single wire braid hydraulic hose with parts broken away and parts in cross section illustrating a conventional hose construction.

By referring to the drawing and FIG. 1 by way of example, it will be seen that a typical hydraulic control hose of the covered single wire braid type is illustrated and that the same consists of a seamless oil and grease resisting rubber like tube 10 having one tubular braid of high tensile steel wire 11 formed thereover, a tubular textile anchor braid 12 is formed over the tubular wire braid 11, an oil, abrasion and weather resisting rubber like cover 13 completes the hose.

Figure 2:
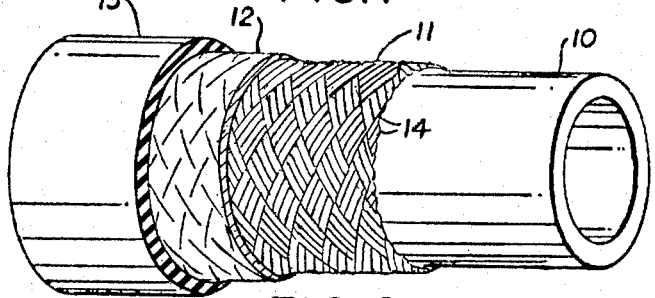
FIG. 2 is a view similar to FIG. 1 showing the improved construction, wire pattern and detail following the method disclosed herein.

As will be understood by those skilled in the art, the hose disclosed herein is formed on an elongated mandrel, the rubber like tube 10 being initially formed thereon and the mandrel with the rubber like tube 10 thereon then passed through a wire braiding machine where the tubular wire braid 11 is formed thereover. The mandrel with the partly formed hose thereon may then be passed through a textile braiding machine and a textile anchor braid 12 added if desired, as in the example illustrated. The rubber like cover 13 is then applied and the hose is then vulcanized when elastomers are used or set when polymers are used. The fabricated hose is then removed from the mandrel. The hose is then immediately connected to a suitable means for exerting pressure therein and the preconditioning step is performed by introducing fluid under pressure into the hose to a pressure just below the bursting strength of the hose. For practical purposes this is approximately 80% to 95% of the average known burst pressure of the hose. For example, a typical ½" I.D. double wire braid hydraulic hose having a known average burst pressure rating of approximately 16,000 p.s.i. is subjected to a pressure of approximately 13,600 p.s.i. The pressure is introduced relatively fast, usually in two to three seconds. In hoses formed with elastomers the pressure is immediately released, in hoses formed with polymers the pressure is held one minute before release. This preconditioning step which may be termed prestressing causes the repositioning and alignment of the individual wires in the wire braid so that they are arranged in a perfect braid pattern as illustrated in FIG. 2 of the drawings as contrasted with an irregular braid pattern as shown in exaggerated detail in FIG. 1 of the drawings.

Tests indicate that the preconditioning step results in the desired increased life of the hose only when the pressure is applied with the critical limits of approximately 80% to approximately 95% of the average known burst pressure of the hose. Pressures below 80% do not yield the desired results and the pressures in excess of 95% are not commercially practical although possible within the burst limits of the hose. It is the usual commercial practice to use pressures from approximately 85% to approximately 90% of the known burst pressure of the hose in preconditioning the hose as set forth herein.

In the industry samples of hydraulic hose are subjected to tests at some time after its manufacture, such tests introduce pressures between 50% and 70% of the known burst pressure of the hose. To demonstrate the differences between such testing and the present invention tests were made to compare the impulse life of three lots of hydraulic hose all made under identical conditions, using the same rubber compounds and the same batch of wire. The purpose of the tests was to determine the difference in impulse life among the lots, each of which was prepressurized to different pressures of 50%, 70% and 90% of average burst pressure of the hose. The tests showed significant differences between the three lots tested, with the lowest pressurizing giving the shortest impulse life and the highest pressurizing giving the longest impulse life.

TEST SPECIMENS

Three sixty-foot lengths of hydraulic hose were made using rubber compounds and steel wire from the same batches. The lengths were all made on the same braider, lead pressed and vulcanized at the same time, so as to have all lengths identical. From each length of hose, 12" sections were cut from each end. Each section (six in all) was burst in accordance with industry standards. The burst results were averaged and the resultant value used in the calculation for pressurizing. Each fifty-eight-foot length was then pressurized to 50%, 70% and 90% of average burst pressure. After pressurizing, six inches of hose at each end of the three lengths was cut off and discarded.

TEST PROCEDURE

From the three lengths of prepressurized hose eight assemblies were prepared and impulsed at 3500 p.s.i. with 5250 p.s.i. peaks. The pressure impulses were applied at a rate of 70 c.p.m. The assemblies were manifolded so that all twenty-four were impulsed at the same time. As the various assemblies failed and were removed from the impulse machine, the machine was readjusted to compensate for the reduced number of specimens.

TEST RESULTS

Burst test; Nonconditioned hydraulic hose

| Sample Nos.: | Burst, p.s.i. |
| --- | --- |
| 1 | 16,400 |
| 2 | 15,900 |
| 3 | 15,900 |
| 4 | 17,000 |
| 5 | 16,800 |
| 6 | 16,400 |
| Average burst pressure | 16,400 |

IMPULSE RESULTS; HYDRAULIC HOSE

| Group I | Group II | Group III |
| --- | --- | --- |
| Prepressurized to— | | |
| [1]50%=(8,200 p.s.i.) | [1]70%=(11,500 p.s.i.) | [1]90%=(14,750 p.s.i.) |
| 52,860 | 241,116 | 907,592 |
| 53,102 | 270,489 | 907,744 |
| 53,630 | 287,319 | 1,124,052 |
| 59,148 | 314,000 | 1,195,493 |
| 64,711 | 376,183 | +1,300,000 |
| 68,015 | 392,160 | +1,300,000 |
| 68,777 | 399,420 | +1,300,000 |
| 69,908 | 402,423 | +1,300,000 |

[1] Of burst pressure.

For comparison the same pressure impulse tests were made immediately after manufacture of samples of non preconditioned hydraulic hose the same as the hose used in the preceding tests and having the same average burst pressure.

IMPULSE RESULTS; NO PREPRESSURIZATION

| Sample No.: | Impulse results |
| --- | --- |
| 1 | 32,694 |
| 2 | 34,073 |
| 3 | 35,066 |
| 4 | 35,815 |
| 5 | 40,630 |

By referring to the drawings and FIG. 1 in particular, it will be observed that the irregular braid pattern and the positioning of the reinforcing wires forming the tubular wire braid 11 are illustrated in exaggerated, irregular or misaligned condition; whereas in FIG. 2 of the drawings which represents the hose after the preconditioning step has been performed thereon immediately after manufacture the wires of the tubular wire braid 11 are shown in perfect alignment and in side by side contact so as to form a perfect flexible metallic sheath-like braid with no spacing or openings between the individual wires thereof or between the groups of wires thereof.

Another group of samples of hydraulic hose preconditioned in accordance with the method disclosed herein were subject to tests on a square wave impulse machine at 2000 p.s.i. with 3000 p.s.i. peaks and six such samples reach 600,000 impulses whereupon the pressure was increased to 3750 p.s.i. peaks and the following additional cycles over 600,000 were obtained before failure:

| Sample No.: | Impulses over 600,000 |
| --- | --- |
| 1 | 135,029 |
| 2 | 163,847 |
| 3 | 172,257 |
| 4 | 180,208 |
| 5 | 265,411 |
| 6 | 476,541 |

In FIGS. 1 and 2 of the drawings the individual wires are indicated by the numeral 14 and arranged in groups, the number of wires in each group being arbitrarily selected for the purpose of illustration only and not necessarily representing the actual number of wires found in a typical wire braid in a hose. The wire is brass finished high carbon steel wire having a tensile range from 330,000 to 355,000 p.s.i. The preconditioning method disclosed herein does not subject the wire to stress in excess of its elastic limit.

It will thus be seen that the hydraulic hose after being formed in the usual manner is prestressed in the preconditioning step which comprises a new and important procedure in the method of making the hose assuring its substantially increased life.

Figure 3:
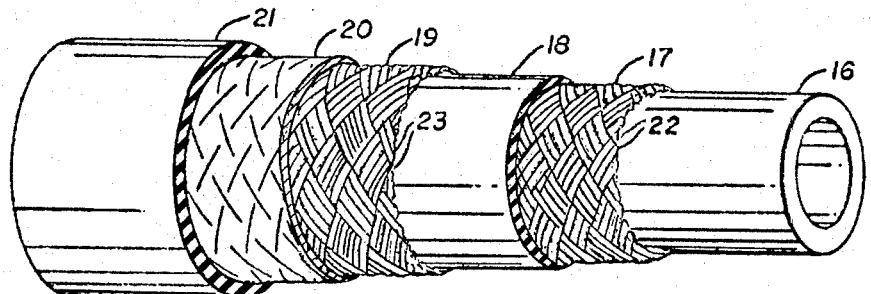
FIG. 3 is a side elevation of a portion of a double wire braid hydraulic hose with parts broken away and parts in cross section illustrating a conventional hose construction.
Figure 4:
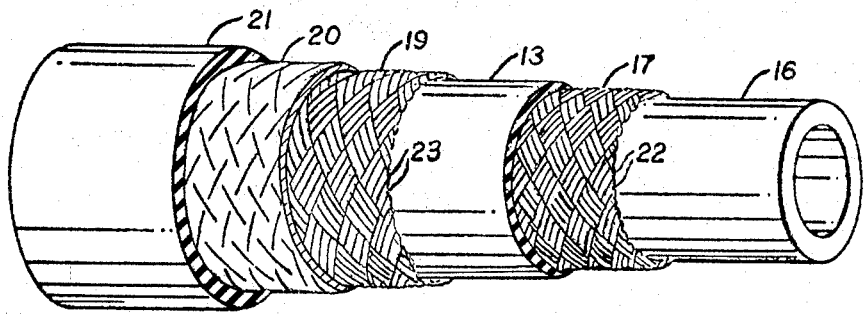
FIG. 4 is a view similar to FIG. 3 showing the improved construction, wire pattern and detail following the method disclosed herein.

By referring now to FIGS. 3 and 4 of the drawings, a double wire braid hydraulic control hose is shown wherein a seamless oil and grease resisting rubber like tube 16 has a first tubular wire braid 17 of high tensile steel wire formed thereabout longitudinally thereof, a tubular rubber like layer 18 is positioned thereover and a second tubular wire braid 19 is formed thereover. A tubular textile anchor braid 20 and a cover 21, of oil, abrasion and weather resisting rubber like material completes the double wire braid hose, which is typical in the art.

It will be observed that in FIG. 3 of the drawings the individual wires 22 and 23 respectively make up the tubular wire braids 17 and 19 respectively and that they are illustrated in exaggerated detail as showing spacing between some of the individual wires and showing some misalignment of the actual groups of wires forming the braids themselves.

By referring to FIG. 4 of the drawings, it will be seen that the hose of FIG. 4 is illustrated after it has been subjected to the preconditioning step in its manufacture as hereinbefore described and it will be observed that the wires 22 and 23 of the wire braids 17 and 19 are now in exact and perfect alignment with one another as are the groups of wires forming the respective braid sections and that the individual wires as well as the groups of wires are in intimate contact with one another leaving no openings or irregular spacing in the construction. The rubber tube 16 and the tubular insulation layer 18 are thus completely and uniformly supported on their outermost surfaces by the reinforcing wire braids 17 and 19 respectively and as a result a highly flexible wire reinforced hydraulic hose capable of withstanding unusually high pressures through a greatly extended life has been produced.

It is well known to those skilled in the art that all hose of the hydraulic type has a minimum burst pressure rating. In effect it is established when the hydraulic hose is made that a certain pressure represents the mark below which the hose will not burst because of internal pressure. Hydraulic hose is usually sold with two pressure ratings. The first is the working pressure. The second is the minimum burst pressure. It is also well known that when a hydraulic hose is made it is subject to an additional test at an additional pressure. This pressure is called the proof pressure and has customarily been twice the rated working pressure or 50% of the rated minimum burst pressure. It is obvious, therefore, that the minimum burst pressure is established before the hose is made.

It will occur to those skilled in the art that the reinforcing wires may be positioned in the hose in arrangements other than the braid disclosed herein, for example, a spiral wrapped reinforcing wire or wires may be used. The term rubber like as used herein includes both elastomers and polymers. Elastomers used in the hose may include natural and synthetic rubber such as neoprene, nitrile ruber, (Buna N), styrene butadiene rubber, Hypalon and the like. Polymers may include Teflon, nylon, Dacron and Mylar and the like.

It will occur to those skilled in the art the preconditioning method disclosed herein will work effectively on hydraulic hose formed with or without the customary cover. Some hose constructions eliminate the fabric braid and others substitute a fabric cover held on the hose assembly by improved adhesives which improve the bond between the reinforcing wire and cover, whether it is of rubber-like material or other suitable material.

Having thus described our invention what we claim is:

1. The method of preconditioning a wire braid reinforced hydraulic hose having a known average bust pressure and a known average life of pressure impulse cycles consisting of providing a source of fluid pressure and immediately after fabrication of said hose closing one end thereof and connecting the other end thereof to said source of fluid pressure, introducing said fluid pressure into said hose until an internal pressure of between 80% and 95% of said known burst pressure is obtained, holding said pressure momentarily and relieving the same whereby the wires of said wire braid are realigned and repositioned into permanent close contact with each other.

2. The method of claim 1 wherein the pressure in said hose is built up as rapidly as possible.

3. The method of claim 1 wherein the pressure in said hose is held for a time between one second and one minute and then relieved.

4. The method of claim 3 wherein the pressure in said hose is built up as rapidly as possible.

5. The method of preconditioning a wire braid hydraulic hose having a known burst pressure consisting of subjecting said hose immediately after completion to an internal pressure of between about 80% to 95% of said known burst pressure so as to straighten and realign and reposition the wires of said wire braid into permanent close relationship.

References Cited

UNITED STATES PATENTS 3,240,644    3/1966    Wolff _____ 156—165

OTHER REFERENCES

Military Specification, MIL-H-8788A, "Hose, Hydraulic and Pneumatic, High Pressure," 1958, pp. 1-9.

GEORGE F. LESMES, Primary Examiner

J. C. GIL, Assistant Examiner

U.S. Cl. X.R.

138—127; 156—148, 149, 165, 287; 264—94, 340